United States Patent
Kimura (10) Patent No.: US 8,395,698 B2
(45) Date of Patent: Mar. 12, 2013

(54) EXPOSURE DETERMINING DEVICE AND IMAGE PROCESSING APPARATUS

(75) Inventor: Takayuki Kimura, Kariya (JP)

(73) Assignee: Denso Corporation, Kariya (JP)

(*) Notice: Subject to any disclaimer, the term of this patent is extended or adjusted under 35 U.S.C. 154(b) by 617 days.

(21) Appl. No.: 12/462,706

(22) Filed: Aug. 7, 2009

(65) Prior Publication Data

US 2010/0033619 A1 Feb. 11, 2010

(30) Foreign Application Priority Data

Aug. 8, 2008 (JP) ................................ 2008-205636

(51) Int. Cl.
*H04N 5/238* (2006.01)
*H04N 5/235* (2006.01)
*G03B 7/00* (2006.01)

(52) U.S. Cl. ...................... 348/364; 348/362; 348/221.1
(58) Field of Classification Search ............... 348/222.1, 348/362, 364
See application file for complete search history.

(56) References Cited

U.S. PATENT DOCUMENTS

| | | | | |
|---|---|---|---|---|
| 5,801,773 A | * | 9/1998 | Ikeda | .......................... 348/229.1 |
| 2004/0145673 A1 | * | 7/2004 | Washisu | ........................ 348/364 |
| 2005/0256636 A1 | * | 11/2005 | Miyashita et al. | ............ 701/207 |
| 2005/0265626 A1 | * | 12/2005 | Endo et al. | ..................... 382/274 |
| 2007/0126921 A1 | * | 6/2007 | Gallagher et al. | ............ 348/362 |
| 2008/0024616 A1 | * | 1/2008 | Takahashi | .................. 348/221.1 |

FOREIGN PATENT DOCUMENTS

| | | |
|---|---|---|
| JP | 2000-209488 | 7/2000 |
| JP | 2000-295521 | 10/2000 |
| JP | 2001-005966 | 1/2001 |
| JP | 2003-319250 | 11/2003 |
| JP | 2005-148309 | 6/2005 |
| JP | 2006-245909 | 9/2006 |

* cited by examiner

*Primary Examiner* — Nicholas Giles
*Assistant Examiner* — Stephen Coleman
(74) *Attorney, Agent, or Firm* — Harness, Dickey & Pierce, PLC (57) ABSTRACT

In an exposure determining device, an image acquiring unit acquires a first image. The first image is picked up by an image pickup unit at a first exposure. A light-intensity detecting unit extracts areas in the first image and detects a light intensity in area. A mismatch area determining unit determines, based on the detected light intensity in each area, whether each area is a mismatch area in which an edge is estimated to be undetected due to excess or shortage of the first exposure for a corresponding one of the areas. When it is determined that one of the areas is the mismatch area, a second exposure determining unit determines a second exposure of the image pickup unit. The second exposure is matched with the light intensity in the mismatch area.

18 Claims, 3 Drawing Sheets

EXPOSURE DETERMINING DEVICE AND IMAGE PROCESSING APPARATUS

CROSS REFERENCE TO RELATED APPLICATIONS

This application is based on Japanese Patent Application 2008-205636 filed on Aug. 8, 2008. This application claims the benefit of priority from the Japanese Patent Application, so that the descriptions of which are all incorporated herein by reference.

FIELD OF THE INVENTION

The present invention relates to exposure determining devices for determining the exposure of an image pickup unit before the image pickup unit picks up images, and image processing apparatuses equipped with such exposure determining devices.

BACKGROUND OF THE INVENTION

Image processing apparatuses having a function of detecting "edges" in picked-up images are wisely used in various areas; these "edges" means the boundaries at which the image brightness or the color changes. One type of such image processing apparatuses for example disclosed in Japanese Patent Application Publication No. 2001-005966 is designed to cause an image pickup unit to perform a previously determined number of, such as three or more, image pickups while changing the exposure amount of the image pickup unit. The number of image pickups has been previously determined for each of luminance (brightness) ranges of targets to be picked up.

Because the exposure amount of the image pickup unit is changed at the previously determined number of image pickups, it is possible to achieve images with large dynamic ranges relative to the dynamic range of the image pickup unit. Note that the dynamic range means the range between the maximum illumination intensity and the minimum illumination intensity of images that an image pickup unit can pick up.

Thus, even if areas in picked up images are different in luminance from each other, it is possible to detect edges in the picked-up images; these areas correspond to, for example, sunny and shaded regions to be picked up.

However, such an image processing apparatus of this type always needs to perform the previously determined number of image pickups for the luminance range of each target to be picked up, and to perform image processing based on each of the picked-up images so as to detect edges. This may cause, even if there is no need to perform the previously determined number of image pickups, the image processing apparatus to perform the previously determined number of image pickups for the brightness range of each target to be picked up, and to perform image processing based on each of the picked-up images so as to detect edges.

This therefore may increase processing loads of the image processing apparatus upon detection of edges.

SUMMARY OF THE INVENTION

In view of the circumstances set force above, an object of an aspect of the present invention is to provide techniques that allow image processing apparatuses to accurately detect edges while reducing processing loads of the image processing apparatuses as low as possible.

According to one aspect of the present invention, there is provided an exposure determining device for an image pickup unit. The device includes an image acquiring unit configured to acquire a first image. The first image is picked up by the image pickup unit at previously determined first exposure. The device includes a light-intensity detecting unit configured to extract a plurality of areas in the first image and detect a light intensity in each of the plurality of areas. The device includes a mismatch area determining unit configured to determine, based on the detected light intensity in each of the plurality of areas, whether each of the plurality of areas is at least one mismatch area in which an edge is estimated to be undetected due to any one of excess and shortage of the first exposure for a corresponding one of the plurality of areas. The device includes a second exposure determining unit configured to, when it is determined that at least one of the plurality of areas is the at least one mismatch area, determine a second exposure of the image pickup unit. The second exposure is matched with the light intensity in the at least one mismatch area.

According to another aspect of the present invention, there is provided a program product embedded in a media accessible by a computer of an exposure determining device for an image pickup unit. The program product includes a first step for instructing the computer to acquire a first image. The first image is picked up by the image pickup unit at previously determined first exposure. The program product includes a second step for instructing the computer to extract a plurality of areas in the first image and detect a light intensity in each of the plurality of areas. The program product includes a third step for instructing the computer to determine, based on the detected light intensity in each of the plurality of areas, whether each of the plurality of areas is at least one mismatch area in which an edge is estimated to be undetected due to any one of excess and shortage of the first exposure for a corresponding one of the plurality of areas. The program product includes a fourth step for instructing the computer to, when it is determined that at least one of the plurality of areas is the at least one mismatch area, determine a second exposure of the image pickup unit. The second exposure is matched with the light intensity in the at least one mismatch area.

According to a further aspect of the present invention, there is provided an image processing unit for an image pickup unit. The image processing unit includes a first image acquiring unit configured to cause the image pickup unit to pick up a first image at previously determined first exposure to thereby acquire the first image. The image processing unit includes a light-intensity detecting unit configured to extract a plurality of areas in the first image and detect a light intensity in each of the plurality of areas. The image processing unit includes a mismatch area determining unit configured to determine, based on the detected light intensity in each of the plurality of areas, whether each of the plurality of areas is at least one mismatch area in which an edge is estimated to be undetected due to any one of excess and shortage of the first exposure for a corresponding one of the plurality of areas. The image processing unit includes a second exposure determining unit configured to, when it is determined that at least one of the plurality of areas is the at least one mismatch area, determine a second exposure of the image pickup unit. The second exposure is matched with the light intensity in the at least one mismatch area. The image processing unit includes a second image acquiring unit configured to cause the image pickup unit to pick up a second image at the second exposure to thereby acquire the second image. The image processing unit includes an edge detector configured to detect an edge in at least one of the first image and the second image.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

An embodiment of the present invention will be described hereinafter with reference to the accompanying drawings. In the drawings, identical reference characters are utilized to identify identical corresponding components.

In the embodiment, the present invention is applied to a lane detection system 1 installed in a vehicle as an example of image processing apparatuses.

Figure 1:
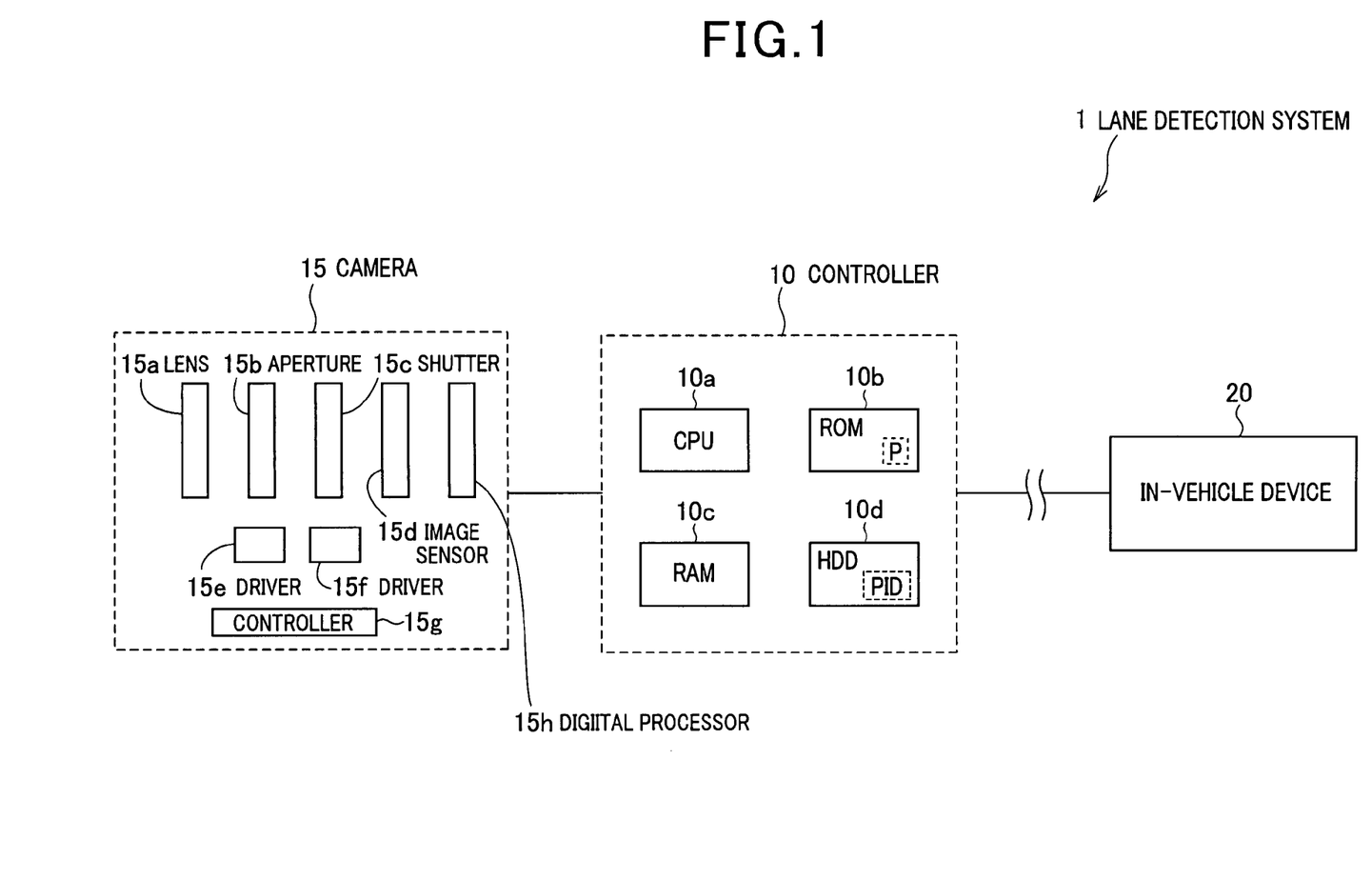
FIG. 1 is a block diagram schematically illustrating an example of the overall hardware structure of a lane detection system installed in a vehicle according to an embodiment of the present invention.

Referring to FIG. 1, the lane detection system 1 is provided with a controller 10, a camera 15 as an example of image pickup units communicably connected to the controller 10, and an in-vehicle device 20 communicably connected to the controller 10.

The controller 10 is designed as, for example, a normal microcomputer circuit consisting of, for example, a CPU 10a, a ROM (Read Only Memory), such as a rewritable ROM 10b, a RAM (Random Access Memory) 10c, a HDD (Hard Disk Drive; HDD) 10d, and other peripheral devices (not shown). The CPU 10a, ROM 10b, RAM 10c, HDD 10d, and the other peripheral devices are communicable with each other.

The ROM 10b stores therein beforehand a plurality of programs including a lane detection program P including an exposure determining subprogram. Each of the plurality of programs causes the CPU 10a to carry out a corresponding routine. For example, the lane detection program P instructs the CPU 10a to control the exposure of the camera 15 and to detect, based on images picked up by the camera 15, lanes (lane positions) on a load surface in front of the vehicle.

The RAM 10c serves as a work area being used by the running CPU 10a.

The HDD 10d stores therein beforehand various items of information usable by the CPU 10a and can store various items of information sent from the CPU 10a or the in-vehicle device 20.

The camera 15 is mounted on the front side of a body (outer shell) mounted on a frame of the vehicle and operative to pick up two-dimensional images (frame images) of a predetermined target region on a road surface in front of the vehicle. The vertical direction and horizontal direction of each picked-up image correspond to the forward direction and the width direction of the vehicle, respectively.

Each picked-up image for example consists of a plurality of pixels arrayed in matrix; each of the pixels represents the light intensity (brightness, luminance) of a corresponding location thereof.

The camera 15 is also operative to control by itself the exposure thereof based on the ambient light so as to obtain picked-up images each with suitable contrast. The contrast means the luminance (light-intensity or brightness) range of an image. For example, the camera 15 is operative to calculate the average luminance of all pixels of picked-up images, and control by itself the exposure thereof based on the calculated average luminance as the ambient light.

Specifically, the camera 15 is made up of a lens 15a, an aperture 15b, a shutter 15c, an image sensor 15d, drivers 15e and 15f, a controller 15g, and a digital processor 15h.

The lens 15a consists of one or more pieces of optical glass or similar material designed to collect and focus light.

The aperture 15b is designed, as an opening with an adjustable size, such that part of the light collected by the lens 15a passes therethrough to thereby control the amount of light to be picked up by the image sensor 15d.

The shutter 15c is designed to be openable and operative to control the time during which the light passing through the aperture 15b reaches the image sensor 15d. That is, the opening speed (shutter speed) determines the time during which the light passing through the aperture 15b reaches the image sensor 15d.

The image sensor 15d consists of a plurality of light-sensitive elements arrayed in matrix constituting a light sensitive pixel area; each of the light-sensitive elements corresponds to one pixel of an image to be picked up by the image sensor 15d.

When light is received by the light sensitive pixel area of the image sensor 15d, the received light is converted into an electric analog image by the light-sensitive elements.

The image sensor 15d is provided with an amplifier for amplifying the analog image detected thereby, and is communicably connected to the controller 15g. The gain of the amplifier is controllable by the controller 15g so that an ISO (International Organization Standard) sensitivity of the image sensor 15d is adjustable by the controller 15g.

The driver 15e is communicably connected to the controller 15g and operative to change the opening size of the aperture 15b under control of the controller 15g to thereby control the amount of light to be picked up by the image sensor 15d.

The driver 15f is communicably connected to the controller 15g and operative to adjust the shutter speed of the shutter 15c to thereby determine the time during which the light passing through the aperture 15b is irradiated onto the pixel area of the image sensor 15d.

The controller 15g is communicably connected to the CPU 10a of the controller 10.

The controller 15g is operative to calculate the average luminance of all pixels of images picked up by the image sensor 15d, and control by itself the exposure of the camera 15 based on the calculated average luminance as the ambient light.

The digital processor 15h is operative to convert the analog image into digital image, and output the digital image to the controller 10.

In addition, the camera 15 is operative to control the exposure thereof in response to instructions supplied from the controller 10.

The exposure of the camera 15 means at least one exposure parameter that determines the quantity of light to be irradiated onto the pixel area of the image sensor 15d.

When receiving instructions for determining a target exposure value indicative of the exposure of the camera 15 sent from the CPU 10*a* of the controller 10, the controller 15*g* changes at least one of: the opening size of the aperture 15*b*, the shutter speed of the shutter 15*c*, and the gain of the amplifier of the image sensor 15*d* in accordance with the received instructions. This allows the target exposure value of the camera 15 to be set.

The in-vehicle device 20 is installed in the vehicle and operative to carry out various tasks, such as controlled target controlling tasks, associated with the operating conditions (driving conditions) of the vehicle based on the execution results of the plurality of programs by the controller 10.

For example, an automatic steering controller for automatically controlling the steering of the vehicle based on the execution results of the lane detection program P, or an alarm device for giving the driver of the vehicle "road departure warning" according to the execution results of the lane detection program P can be used as the in-vehicle device 20.

The controller 10 of the lane detection system 1 is designed to start the lane detection program P to thereby execute a lane detection routine every time:

an ignition key is located to an ignition position so that power is supplied during an internal combustion engine and alternator installed in the vehicle are on; or the ignition key is located to an accessory position so that power is supplied form a battery installed in the vehicle.

Thereafter, the lane detection program is cyclically carried out by the controller 10 until the supply of power is stopped.

The lane detection routine to be executed by the CPU 10*a* in accordance with the lane detection program P will be described hereinafter with reference to FIG. 2. Note that the operations in steps S130 to S190 correspond to an exposure determining unit according to the embodiment.

When starting the execution of the lane detection program P, the CPU 10*a* sends, to the camera 15 (the controller 15*g*), an instruction that instructs the camera 15 to pickup a first image at self-determined exposure in step S120.

Based on the instruction sent from the CPU 10*a*, the controller 15*g* obtains the ambient light (ambient brightness) in step S300. For example, the controller 15*g* causes the shutter 15*c* to open to thereby pick up an image of the target region, and calculates the average luminance of all pixels of the picked-up image as the ambient light (ambient brightness) in step S300.

Based on the obtained ambient brightness, the controller 15*g* adjusts by itself at least one of: the opening size of the aperture 15*b*, the shutter speed of the shutter 15*b*, and the gain of the amplifier of the image sensor 15*c* to thereby determine, by itself, first exposure (at least one first exposure parameter) of the camera 15 in step S310.

Next, the controller 15*g* controls the aperture 15*b*, shutter 15*c*, and the image sensor 15*d* based on the first exposure to thereby pick up a first image of the target region at the first exposure in step S320. In step S320, the controller 15*g* sends the picked-up first image in digital format to the controller 10.

The CPU 10*a* of the controller 10 receives (acquires) the picked-up first image sent from the camera 15, and stores the picked-up first image in, for example, the RAM 10*c* in step S130.

Next, the CPU 10*a* extracts a plurality of previously set (programmed) areas (road-surface luminance detection areas) in the picked-up first image, and calculates a luminance in each area of a road surface in step S140.

Figure 3A:
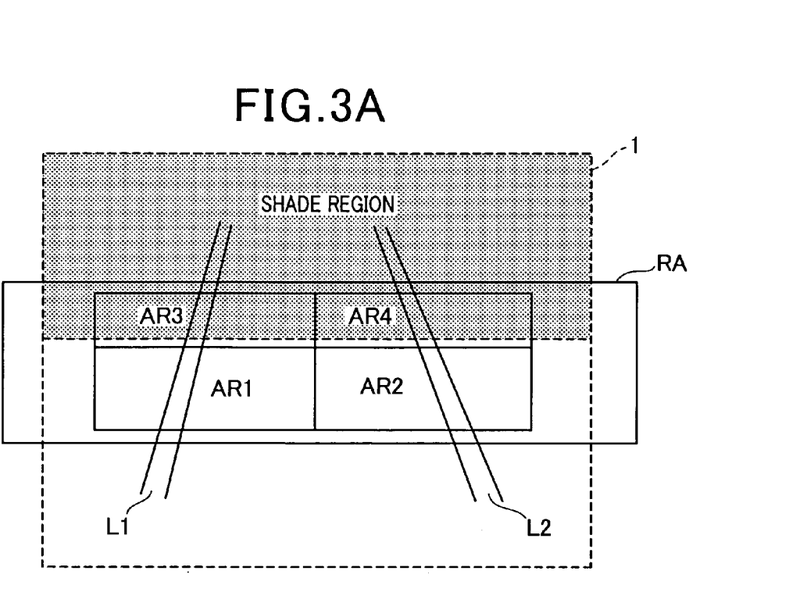
FIG. 3A is a view schematically illustrating an example of a previously set lane-recognition area in a picked-up image assuming that a target region in front of the vehicle includes a sunny region and a shaded region aligned in the forward direction from the vehicle in this order.

Specific operations of the CPU 10*a* in step S140 will be described hereinafter with reference to FIG. 3A. FIG. 3A illustrates an example of a previously set lane-recognition area in a picked-up image I assuming that the target region in front of the vehicle includes a sunny region (light region) and a shaded region (dark region) aligned in the forward direction from the vehicle in this order.

According to the embodiment, a center in the vertical direction of a picked up image I has been set as the lane recognition area RA as a target area for lane recognition. In addition, in the lane recognition area RA, four areas AR1, AR2, AR3, and AR4 adjacently arrayed in two rows in the vertical direction and in two columns in the horizontal direction are set as the load-surface luminance detection areas.

For example, the areas AR3 and AR4 are arranged to constitute a first row in the matrix, and the areas AR1 and AR2 are arranged at the respective lower sides of the areas AR3 and AR4 to constitute a second row of the matrix.

The length and width of the lane recognition area RA have been determined to allow the luminance on portions of road surfaces around lanes to be properly detected. Similarly, the number of the areas in the lane recognition area RA has been determined to allow the luminance on portions of road surfaces around lanes to be properly detected. Moreover, the length and width of each of the areas AR1 to AR4 have been determined to allow the luminance on portions of road surfaces around lanes to be properly detected.

In step S140, the CPU 10*a* calculates the average luminance (average light intensity) of all pixels in each of the areas AR1 to AR4 to thereby estimate the average luminance of each of the areas AR1 to AR4 as the estimated luminance in each of the areas AR1 to AR4 of the road surface Note that the luminance of a road surface except for lanes thereon is estimated to be slightly lower than the average value of a corresponding area in which a lane is contained. For this reason, the increase of the average luminance in each of the areas AR1 to AR4 when a lane is contained therein as compared with the average luminance of a corresponding one of the areas AR1 to AR4 when no lanes are contained therein was estimated by experiments, simulations, or the like. Then, in step S140, the CPU 10*a* can calculate the estimated luminance in each of the areas AR1 to AR4 of the road surface by subtracting the estimated increase from the average luminance in a corresponding one of the areas AR1 to AR4.

In step S140, the CPU 10*a* can set a plurality of road-surface luminance detection areas in the lane recognition area RA such that the road-surface luminance detection areas are located around the lanes contained in the lane recognition area RA.

Figure 3B:
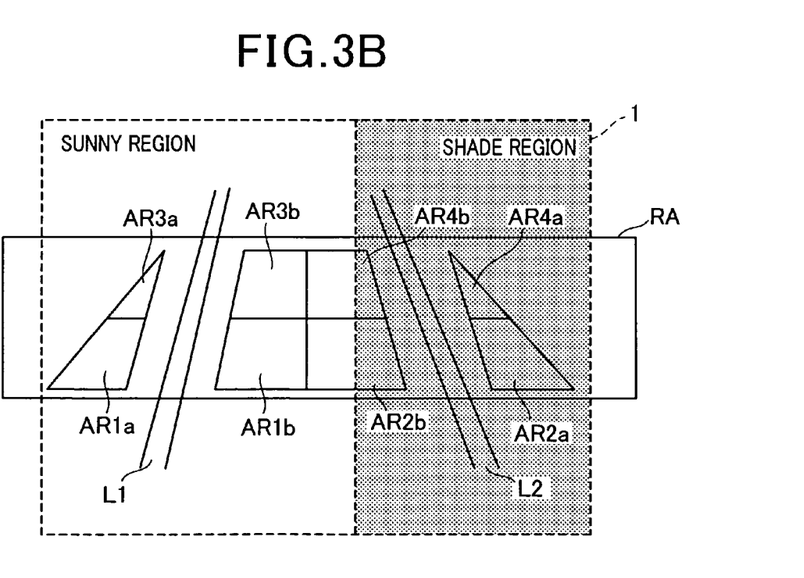
FIG. 3B is a view schematically illustrating another example of the previously set lane-recognition area in a picked-up image assuming that the target region in front of the vehicle includes a sunny region and a shaded region aligned in the width direction from left to right in this order.

Specifically, FIG. 3B illustrates another example of the previously set lane-recognition area RA in a picked-up image I assuming that the target region in front of the vehicle includes a sunny region and a shaded region aligned in the width direction from left to fight in this order.

As illustrated in FIG. 3B, in the lane recognition area RA, four pairs of areas AR1*a*, AR1*b*, AR2*a*, AR2*b*, AR3*a*, AR3*b*, and AR4*a*, AR4*b* adjacently arrayed in two rows in the vertical direction and four columns in the horizontal direction can be set around the lanes L1 and L2 as the road-surface luminance detection areas.

For example, the pair of areas AR3*a* and AR3*b* and the pair of areas AR4*a* and AR4*b* are arranged to constitute a first row in the matrix such that:

the areas AR3*a* and AR3*b* are located on both sides of the lane L1 in the horizontal direction; and the areas AR4*a* and AR4*b* are located on both sides of the lane L2 in the horizontal direction.

Similarly, the pair of areas AR1*a* and AR1*b* and the pair of areas AR2*a* and AR2*b* are arranged to constitute a second row in the matrix such that:

the areas AR1a and AR1b are located on both sides of the lane L1 in the horizontal direction; and the areas AR2a and AR2b are located on both sides of the lane L2 in the horizontal direction.

The arrangement of the road-surface luminance detection areas AR1a, AR1b, AR2a, AR2b, AR3a, AR3b, and AR4a, AR4b permits lanes not to be contained in them. For this reason, it is possible to increase the accuracy of estimating the average luminance of each of the road-surface luminance detection areas AR1a, AR1b, AR2a, AR2b, AR3a, AR3b, and AR4a, AR4b as the luminance of the road surface contained in a corresponding one of the road-surface luminance detection areas AR1a, AR1b, AR2a, AR2b, AR3a, AR3b, and AR4a, AR4b.

After the operation in step S140, the CPU 10a determines a level of mismatch in exposure in each of the areas AR1 to AR4 in step S150.

Specifically, the CPU 10a determines correct exposure for each of the areas AR1 to AR4 based on the calculated luminance in a corresponding one of the areas AR1 to AR4 of the road surface; this correct exposure for each of the areas AR1 to AR4 is most suitable for picking up a corresponding one of the areas AR1 to AR4 in the target region.

Next, the CPU 10a compares the determined correct exposure for each of the areas AR1 to AR4 with the first exposure determined by the camera 15 itself in step S150b.

The CPU 10a determines the level of mismatch in exposure in each of the areas AR1 to AR4 based on the results of comparison in step S150b. Note that the level of mismatch in exposure will be referred to as "exposure mismatch level" herein after.

Specifically, in step S150b, the CPU 10a determines the exposure mismatch level in each of the areas AR1 to AR4 such that the greater the difference between the correct exposure for each of the areas AR1 to AR4 and the first exposure is, the higher the exposure mismatch level in a corresponding one of the road-surface luminance detection areas AR1 to AR4 is in step S150c.

In other words, the CPU 10a determines the exposure mismatch level in each of the areas AR1 to AR4 such that, the higher (overexposure) or lower (underexposure) the first exposure is relative to the correct exposure for each of the areas AR1 to AR4, the higher the exposure mismatch level in a corresponding one of the road-surface luminance detection areas AR1 to AR4 is in step S150c.

For example, when determining a value of the exposure mismatch level in each of the areas AR1 to AR4 to any one of five stepped levels of level 0, level 1, level 2, level 3, and level 4 in ascending order, the CPU 10a determines the value of the exposure mismatch level in an area to the level 0 (minimum level) when the difference between the correct exposure for the area and the first exposure is equal to or lower than a first threshold.

The CPU 10a determines a value of the exposure mismatch level in an area to the level 1 when the difference between the correct exposure for the area and the first exposure is greater than the first threshold and equal to or lower than a second threshold higher than the first threshold.

The CPU 10a determines a value of the exposure mismatch level in an area to the level 2 when the difference between the correct exposure for the area and the first exposure is greater than the second threshold and equal to or lower than a third threshold higher than the second threshold.

The CPU 10a determines a value of the exposure mismatch level in an area to the level 3 when the difference between the correct exposure for the area and the first exposure is greater than the third threshold and equal to or lower than a fourth threshold higher than the third threshold.

The CPU 10a determines a value of the exposure mismatch level in an area to the level 4 (maximum level) when the difference between the correct exposure for the area and the first exposure is greater than the fourth threshold.

Next, the CPU 10a determines whether there is at least one mismatch area in all of the areas AR1 to AR4; edges are estimated to be undetected in this at least one mismatch area in step S160. Specifically, in step S160, the CPU 10a determines whether a value of the exposure mismatch level in one target area ARk (k=1, 2, 3, or 4) in the areas AR1 to AR4 is equal to or greater than a variably set exposure threshold.

The CPU 10a variably sets the exposure threshold to a value depending on a dynamic range, in other words, a resolution, of the first image picked up by the camera 15 at the first exposure in step S160.

More specifically, in step S160, the CPU 10a obtains a distribution of the luminances of the road surface based on the pixels of the first image picked up at the first exposure, and obtains the range of the luminances within which edges in the first image can be detected. In step S160, the CPU 10a sets the exposure threshold over the obtained range of the luminances.

For example, when the obtained range of the luminances of the road surface based on the pixels of the first image picked up at the first exposure corresponds to the range of the estimated luminances corresponding to the range from the level 0 to the level 2, the CPU 10a sets the exposure threshold to the level 3. Moreover, for example, when the obtained range of the luminances of the road surface based on the pixels of the first image picked up at the first exposure corresponds to the range of the estimated luminances corresponding to the range from the level 0 to the level 3, the CPU 10a sets the exposure threshold to the level 4.

Note that the range of the luminances of the road surface based on the pixels of the first image picked up at the first exposure can be determined by experiments for each of adjusted values of the first exposure. The exposure threshold depending on the determined range of the luminances for each of the adjusted values of the first exposure can be determined by experiments.

When the target region in front of the vehicle is picked up by the camera 15, the ambient brightness (the brightness around the camera 15) corresponds to the brightness of a light region or that of a dark region. For example, the sunny region corresponds to the light region, and the shaded region corresponds to the dark region. For another example, the inside of a tunnel corresponds to the dark region, and the outside thereof corresponds to the light region.

Thus, the first exposure is normally determined based on the ambient brightness corresponding to the light region or dark region. Thus, when the first image is picked up by the camera 15 at the first exposure corresponding to the light region, if there is one mismatch area in all of the areas AR1 to AR4, the second exposure corresponding to the dark region allows edges to be detected in the one mismatch area.

Similarly, when the first image is picked up by the camera 15 at the first exposure corresponding to the dark region, if there is one mismatch area in all of the areas AR1 to AR4, the second exposure corresponding to the light region allows edges to be detected in the one mismatch area.

Specifically, it is assumed that:

the target region in front of the vehicle includes a sunny region and a shaded region aligned in the forward direction from the vehicle in this order illustrated in FIG. 3A; and the first exposure is determined based on the ambient brightness corresponding to the sunny region in FIG. 3A.

In this assumption, a comparatively low level, such as the level 0 or the level 1, is likely to be set to each of the areas AR1 and AR2 contained in the sunny region, and, in contrast, a comparatively high level, such as the level 3 or the level 4, is likely to be set to each of the areas AR3 and AR4 contained in the shaded region.

Upon determining that there are no mismatch areas in all of the areas AR1 to AR4 (the determination in step S160 is NO), the CPU 10a determines that edges can be detected in all of the areas AR1 to AR4 based on the pixels of the first image picked up at the first exposure. Then, the CPU 10a proceeds to step S170, and detects edges in the first image stored in the RAM 10c instep S170.

Next, the CPU 10a analyzes the detected edges to thereby extract, from the detected edges, edges each having a linear or smoothly sloped shape extending over a wide range as lanes on the road surface in step S175. Thereafter, in step S175, the CPU 10a stores, in, for example, the RAM 10c, coordinates (addresses) of the extracted edges as position data of the lanes on the road surface in front of the vehicle. Thereafter, the CPU 10a exits the current lane detection routine, and after one cycle has elapsed since the exit, the CPU 10a performs lane detection routine.

Otherwise, upon determining that there is at least one mismatch area in all of the areas AR1 to AR4 (the determination in step S160 is YES), the CPU 10a determines that edges cannot be detected in the at least one mismatch area (at least one of the areas AR1 to AR4). Then, the CPU 10a proceeds to step S180.

In step S180, the CPU 10a determines at least one of: the opening size of the aperture 15b of the camera 15, the shutter speed of the shutter 15b of the camera 15, and the gain of the amplifier of the image sensor 15c of the camera 15 as second exposure (at least one second exposure parameter) of the camera 15.

Specifically, in step S180, when some mismatch areas are detected in step S160, the CPU 10a determines the second exposure such that the determined second exposure is the most suitable exposure when at least one of some mismatch areas detected in step S160, to which the greatest value of the exposure mismatch level has been set in some mismatch areas, is picked up by the camera 15. The at least one of some mismatch areas detected in step S160, to which the greatest value of the exposure mismatch level has been set in some mismatch areas, means an area in which the difference between the correct exposure for the area and the first exposure is greatest among all of the differences for all of the areas AR1 to AR4.

For example, in this assumption illustrated in FIG. 3A, when the exposure threshold is set to the level 2, the areas AR3 and AR4 are detected as the mismatch areas in step S160. At that time, when the levels 3 and 4 are set to the areas AR3 and AR4, respectively, the second exposure is determined such that the determined second exposure is the most suitable exposure when the mismatch area AR4, to which the maximum level (level 4) has been set, is picked up by the camera 15 (in step S180).

Note that, in step S180, when some mismatch areas are detected in step S160, the CPU 10a can determine the second exposure based on an average of the values of the exposure mismatch levels of the mismatch areas detected in step S160.

Next, the CPU 10a sends, to the camera 15 (the controller 15g), an instruction that instructs the camera 15 to pickup a second image at the second exposure in step S190.

Based on the instruction sent from the CPU 10a, the controller 15g adjusts at least one of: the opening size of the aperture 15b, the shutter speed of the shutter 15b, and the gain of the amplifier of the image sensor 15c to set the exposure of the camera 15 to the second exposure in step S330.

Next, the controller 15g controls the aperture 15b, shutter 15c, and the image sensor 15d based on the second exposure to thereby pick up a second image of the target region at the second exposure in step S340. In step S340, the controller 15g sends the picked-up second image in digital format to the controller 10.

The CPU 10a of the controller 10 receives (acquires) the picked-up second image sent from the camera 15, and stores the picked-up second image in the RAM 10c in step S200.

Next, the CPU 10a detects edges from each of the second image stored in the RAM 10c in step S210.

In step S220, the CPU 10a merges the detected edges from the first image and those from the second image in step S220.

Thereafter, the CPU 10a analyzes the merged data, and, based on the results of analysis, extracts, from the merged image, edges each having a linear or smoothly sloped shape extending over a wide range as lanes on the road surface in step S230. Then, in step S230, the CPU 10a stores, in, for example, the RAM 10c, coordinates (addresses) of the extracted edges in the merged image as position data of the lanes on the road surface in front of the vehicle. Thereafter, the CPU 10a exits the lane detection routine. After one cycle has elapsed since the exit, the CPU 10a performs lane detection routine.

As described above, the controller 10 of the lane detection system 1 according to the embodiment is configured to:

instruct the camera 15 to pick up a first image at the self-determined first exposure;

calculate a road-surface luminance in each of the areas AR1 to AR4 of the first image; and determine, based on the calculated road-surface luminance of each of the areas AR1 to AR4, whether there is at least one mismatch area in all of the areas AR1 to AR4; edges are estimated to be undetected in this at least one mismatch area.

When it is determined that there are no mismatch areas in all of the areas AR1 to AR4, the controller 10 determines that edges can be detected in all of the areas AR1 to AR4 based on the pixels of the first image picked up at the first exposure. Thus, the controller 10 detects edges the first image without picking up a second image at another exposure in each execution of the lane detection routine.

Otherwise, when it is determined that there is at least one mismatch area in all of the areas AR1 to AR4, the controller 10 determines, based on the picked-up first image, second exposure used by the camera 15 to carry out the next image picking up.

Specifically, the controller 10 determines the second exposure that corresponds to the luminance of the at least one mismatch area.

Thereafter, the controller 10 instruct the camera 15 to pick up the second image at the second exposure, and detect edges from each of the first and second images.

With the configuration of the lane detection system 1, when it is determined that the luminance of the road surface in front of the vehicle obtained from the picked-up first image at the first exposure allows edges to be detected, it is possible to omit the determining of another exposure and the picking-up of another image based on another exposure in order to detect edges in each execution of the lane detection routine.

In addition, only when it is determined that the luminance of the road surface in front of the vehicle obtained from the picked-up first image at the first exposure disallows makes difficult to detect edges, the lane detection system 1 carries out the determining of the second exposure and the picking-up of the second exposure based on the second exposure in order to detect edges.

Thus, the lane detection system 1 achieves an advantage of accurately detecting edges while reducing processing loads of the controller 10 as low as possible.

The lane detection system 1 achieves an advantage that lanes on the road surface in front of the vehicle can be detected based on the shapes of the detected edges.

The controller 10 of the lane detection system 1 calculates the average luminance (average light intensity) of all pixels in each of the areas AR1 to AR4 to thereby estimate the average luminance of each of the areas AR1 to AR4 as the estimated luminance in each of the areas AR1 to AR4 of the road surface.

Thus, even if there are variations in the luminances of all pixels in each of the areas AR1 to AR4, it is possible to average the variations in the luminances of all pixels in each of the areas AR1 to AR4.

Additionally, when some mismatch areas are detected, the controller 10 determines the second exposure such that the determined second exposure is the most suitable exposure when one detected mismatch area (one most inappropriate area in exposure) to which the greatest value of the exposure mismatch level has been set in some mismatch areas is picked up by the camera 15.

This achieves an advantage of determining the second exposure that allows one-most inappropriate area in exposure to be picked up with edges therein being reliably detectable.

The present invention is not limited to the embodiment, and the present invention can be applied to various modifications within the scope of the present invention.

For example, in the embodiment, the camera 15 is configured to determine, by itself, the first exposure based on the ambient brightness in steps S300 and S310, but the present invention is not limited to the structure.

Figure 2:
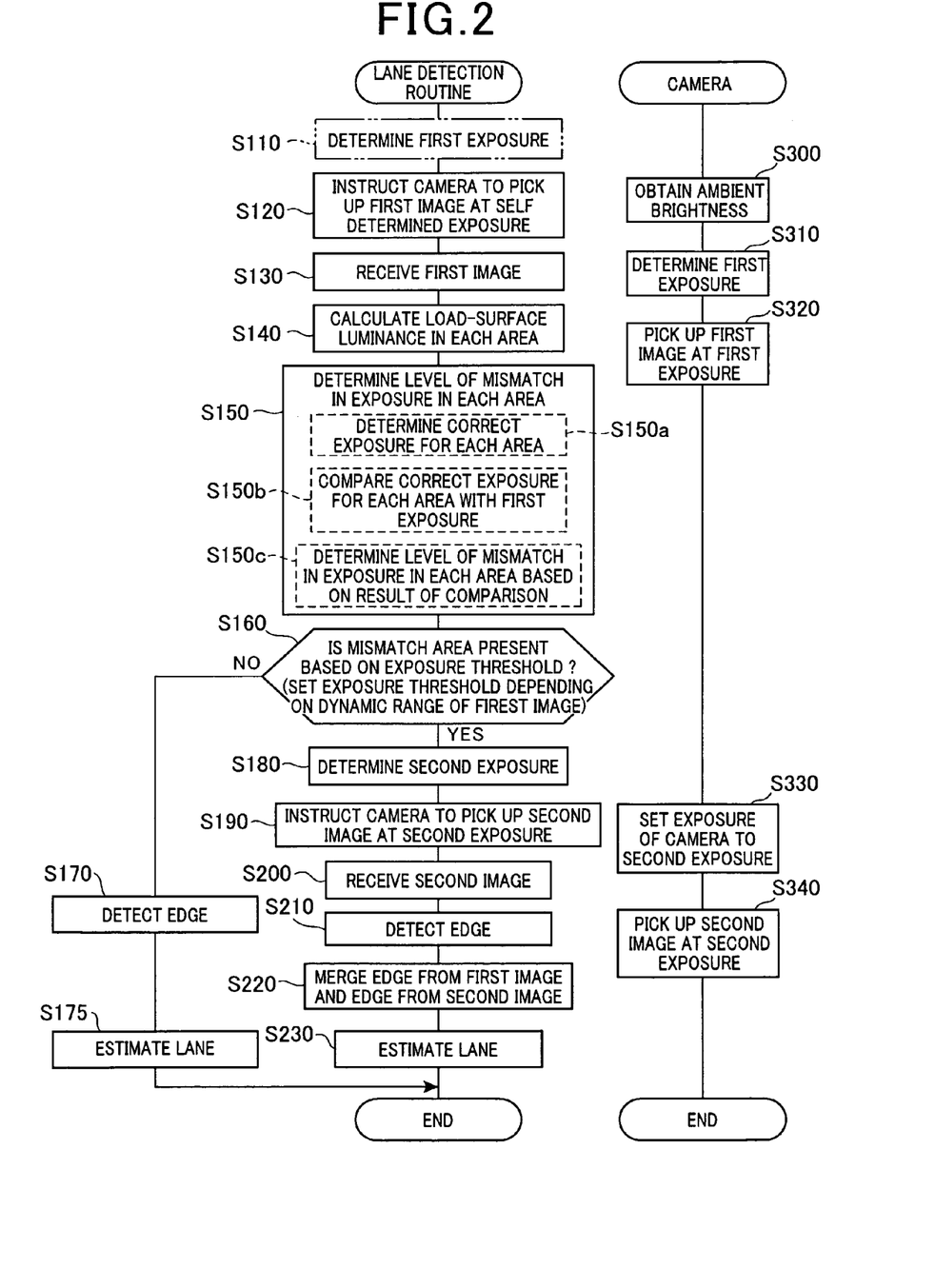
FIG. 2 is a flowchart schematically illustrating a lane detection routine to be executed by a CPU illustrated in FIG. 1 according to the embodiment.

Specifically, in the first modification of the embodiment, referring to FIG. 2, when currently running the lane detection routine, the CPU 10*a* can calculate the average luminance of all pixels in each of the areas AR1 to AR4 of the first image or the second image step S110 illustrated by phantom lines; this first image or second image has been picked up by the camera 15 in the previous execution of the lane detection routine.

Based on the average luminance in each of the areas AR1 to AR4, the CPU 10*a* can determine the first exposure, and send, to the camera 15 (the controller 15*g*), an instruction that instructs the camera 15 to pickup the first image at the second exposure in step S110.

Based on the instruction sent from the CPU 10*a*, the controller 15*g* can adjust at least one of: the opening size of the aperture 15*b*, the shutter speed of the shutter 15*b*, and the gain of the amplifier of the image sensor 15*c* to set the exposure of the camera 15 to the first exposure (see step S320).

When currently executing the lane detection routine, the lane detection system 1 according to the first modification can determine the first exposure based on the luminances of at least some pixels in the first or second image picked up in the previous execution of the lane detection routine.

Specifically, in step S110, the CPU 10*a* can determine the first exposure such that the determined first exposure is the most suitable exposure when one of areas AR1 to AR4, in which the greatest average luminance has been calculated, is picked up by the camera 15. This can maintain, within the dynamic range of the camera 15, the luminances in another area in the areas AR1 to AR4 in the first image picked up by the camera 15 at the first exposure in the next execution of the lane detection routine. This makes it possible to easily determine the second exposure in the next execution of the lane detection.

The lane detection system 1 is designed to suitably detect lanes in the road surface in front of the vehicle, but the controller 10 according to the second modification can detect, except for the lanes, objects; these objects include passers-by, such as pedestrians or bicycles and roadside objects, such as signs or signals.

In the second modification, pattern image data PID is stored beforehand in the HDD 10*d*. The pattern image data PID includes a plurality of target pattern images in digital format respectively indicative of a plurality of features of the objects as targets to be detected by the lane detection system 1.

For example, each of the plurality of pattern images consists of arrayed pixels each representing the light intensity (luminance) of a corresponding location thereof. Each of the pattern images has a corresponding specific pattern of its pixels; this specific pattern corresponds to one of the plurality of features of the objects.

Specifically, in steps S175 and S230, the controller 10 matches the features of the detected edges with each of the plurality of pattern images, and detects at least one of the objects based on the result of the pattern matching.

In the second modification, the features of the detected edges include types of the sings and the states of the signals.

The lane detection routines illustrated in FIG. 2 is an example of various lane detection routines, and therefore, it can be modified within the scope of the subject matter of the present invention.

While there has been described what is at present considered to be the embodiment and its modifications of the present invention, it will be understood that various modifications which are not described yet may be made therein, and it is intended to cover in the appended claims all such modifications as fall within the scope of the invention.

What is claimed is:

1. An exposure determining device for determining an exposure upon pickup by an image pickup unit, the device comprising:

an image acquiring unit that acquires an image being picked up by the image pickup unit at a previously determined first exposure;

a light-intensity detecting unit that extracts a plurality of areas in the picked up image and detects a light intensity in each of the extracted areas;

a mismatch area determining unit that determines, based on the detected light intensity in each of the areas detected by the light-intensity detecting unit, whether each of the areas is a mismatch area in which an edge is estimated to be undetected due to any one of excess and shortage of the first exposure; and when it is determined that any one of the areas is the mismatch area by the mismatch area determining unit, a correct exposure determining unit that determines, as an exposure upon pickup by the image pickup unit, a correct exposure, the correct exposure being matched with the light intensity in the mismatch area; wherein when it is determined that a number of the areas are the mismatch areas by the mismatch area determining unit, the correct exposure determining unit determines, as the exposure upon pickup by the image pickup unit, the correct exposure being matched with the light intensity in one of the mismatch areas, a difference between the correct exposure for the one of the mismatch areas and the first exposure being greatest in the differences between the first exposure and each of the correct exposures of the mismatch areas.

2. An exposure determining device for determining an exposure upon pickup by an image pickup unit, the device comprising:
an image acquiring unit that acquires an image being picked up by the image pickup unit at a previously determined first exposure;
a light-intensity detecting unit that extracts a plurality of areas in the picked up image and detects a light intensity in each of the extracted areas;
a mismatch area determining unit that determines, based on the detected light intensity in each of the areas detected by the light-intensity detecting unit, whether each of the areas is a mismatch area in which an edge is estimated to be undetected due to any one of excess and shortage of the first exposure; and
when it is determined that any one of the areas is the mismatch area by the mismatch area determining unit, a correct exposure determining unit that determines, as an exposure upon pickup by the image pickup unit, a correct exposure, the correct exposure being matched with the light intensity in the mismatch area; wherein
the image pickup unit is configured to cyclically carry out a set of pickup at the first exposure and pickup at the correct exposure, the device further comprising:
a first exposure determining unit that determines the first exposure based on the light intensity in each of the areas detected by the light-intensity detecting unit.

3. An exposure determining program stored on a non-transitory computer readable storage medium for implementing, by a computer, each unit of the exposure determining device recited in claim 1.

4. An image processing apparatus having a function of extracting an edge in a picked-up image, the image processing apparatus comprising:
a first image acquiring unit that causes an image pickup unit to carry out a pickup at a previously determined exposure;
an exposure determining unit that determines, based on a picked-up image at the previously determined exposure, a correct exposure as an exposure for the image pickup unit carrying out a next pickup;
a second image acquiring unit that causes the image pickup unit to carry out a pickup at the correct exposure; and
an edge detector that detects an edge from the picked-up image at the previously determined exposure and a picked-up image at the correct exposure,
wherein the exposure determining unit is configured as the exposure determining device recited in claim 1.

5. An image processing apparatus according to claim 4, further comprising:
a recognizing unit that recognizes, based on a shape of the edge, a white lane or a pedestrian on a road.

6. The exposure determining device according to claim 1, wherein the light-intensity detecting unit detects an average value of all pixels in each of the areas as the light intensity in a corresponding one of the areas.

7. The exposure determining device according to claim 6, wherein the image pickup unit is configured to cyclically carry out a set of pickup at the first exposure and pickup at the correct exposure, the device further comprising:
a first exposure determining unit that determines the first exposure based on the light intensity in each of the areas detected by the light-intensity detecting unit.

8. An exposure determining program stored on a non-transitory computer readable storage medium for implementing, by a computer, each unit of the exposure determining device recited in claim 6.

9. An image processing apparatus having a function of extracting an edge in a picked-up image, the image processing apparatus comprising:
a first image acquiring unit that causes an image pickup unit to carry out a pickup at a previously determined exposure;
an exposure determining unit that determines, based on a picked-up image at the previously determined exposure, a correct exposure as an exposure for the image pickup unit carrying out a next pickup;
a second image acquiring unit that causes the image pickup unit to carry out a pickup at the correct exposure; and
an edge detector that detects an edge from the picked-up image at the previously determined exposure and a picked-up image at the correct exposure,
wherein the exposure determining unit is configured as the exposure determining device recited in claim 6.

10. An image processing apparatus according to claim 9, further comprising:
a recognizing unit that recognizes, based on a shape of the edge, a white lane or a pedestrian on a road.

11. The exposure determining device according to claim 6, wherein, when it is determined that a number of the areas are the mismatch areas by the mismatch area determining unit, the correct exposure determining unit determines, as the exposure upon pickup by the image pickup unit, the correct exposure being matched with the light intensity in one of the mismatch areas, a difference between the correct exposure for the one of the mismatch areas and the first exposure being greatest in the differences between the first exposure and each of the correct exposures of the mismatch areas.

12. An exposure determining program stored on a non-transitory computer readable storage medium for implementing, by a computer, each unit of the exposure determining device recited in claim 11.

13. An image processing apparatus having a function of extracting an edge in a picked-up image, the image processing apparatus comprising:
a first image acquiring unit that causes an image pickup unit to carry out a pickup at a previously determined exposure;
an exposure determining unit that determines, based on a picked-up image at the previously determined exposure, a correct exposure as an exposure for the image pickup unit carrying out a next pickup;
a second image acquiring unit that causes the image pickup unit to carry out a pickup at the correct exposure; and
an edge detector that detects an edge from the picked-up image at the previously determined exposure and a picked-up image at the correct exposure,
wherein the exposure determining unit is configured as the exposure determining device recited in claim 11.

14. An image processing apparatus according to claim 13, further comprising:
a recognizing unit that recognizes, based on a shape of the edge, a white lane or a pedestrian on a road.

15. The exposure determining device according to claim 11, wherein the image pickup unit is configured to cyclically carry out a set of pickup at the first exposure and pickup at the correct exposure, the device further comprising:
a first exposure determining unit that determines the first exposure based on the light intensity in each of the areas detected by the light-intensity detecting unit.

16. An exposure determining program stored on a non-transitory computer readable storage medium for implementing, by a computer, each unit of the exposure determining device recited in claim 15.

17. An image processing apparatus having a function of extracting an edge in a picked-up image, the image processing apparatus comprising:
   a first image acquiring unit that causes an image pickup unit to carry out a pickup at a previously determined exposure;
   an exposure determining unit that determines, based on a picked-up image at the previously determined exposure, a correct exposure as an exposure for the image pickup unit carrying out a next pickup;
   a second image acquiring unit that causes the image pickup unit to carry out a pickup at the correct exposure; and
   an edge detector that detects an edge from the picked-up image at the previously determined exposure and a picked-up image at the correct exposure,
   wherein the exposure determining unit is configured as the exposure determining device recited in claim 15.

18. An image processing apparatus according to claim 17, further comprising:
   a recognizing unit that recognizes, based on a shape of the edge, a white lane or a pedestrian on a road.

* * * * *